Dec. 4, 1951          S. MELITA          2,577,088
PRESSURE ACTUATED COFFEE MAKER
Filed March 28, 1947          4 Sheets-Sheet 1
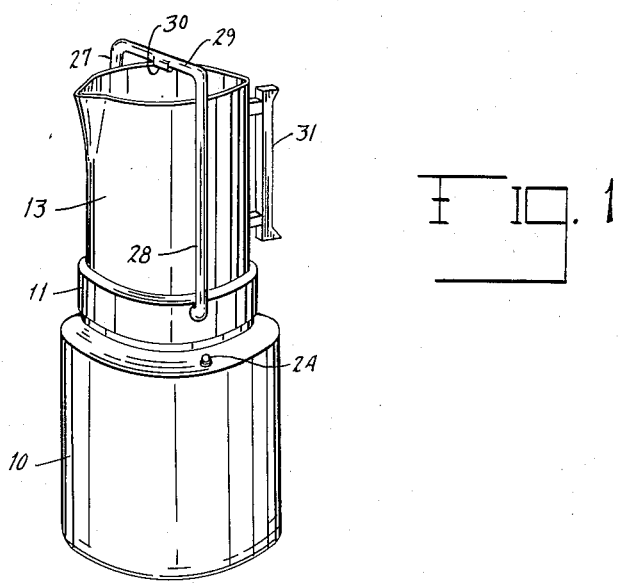
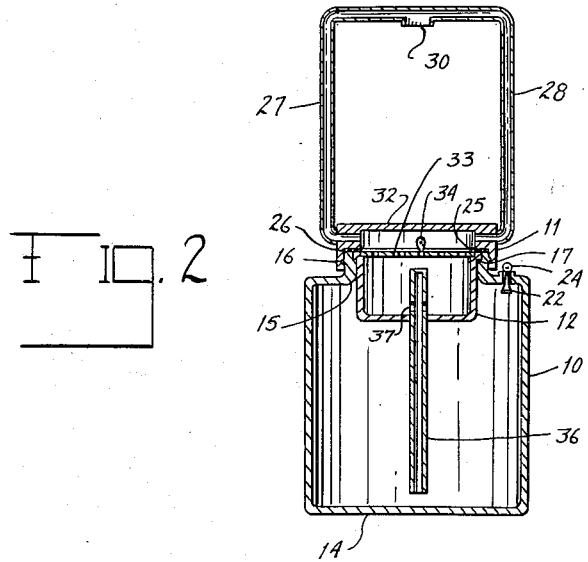
INVENTOR.
SEBASTIANO MELITA
BY Joshua R H Potts
HIS ATTORNEY Dec. 4, 1951 S. MELITA 2,577,088
PRESSURE ACTUATED COFFEE MAKER
Filed March 28, 1947 4 Sheets-Sheet 2
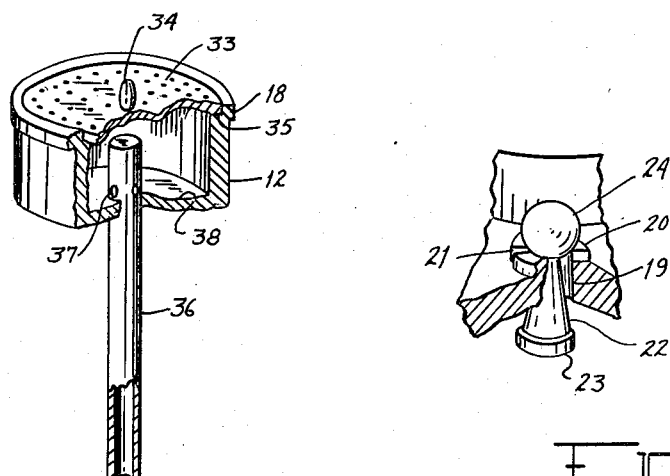
Fig. 3
Fig. 4
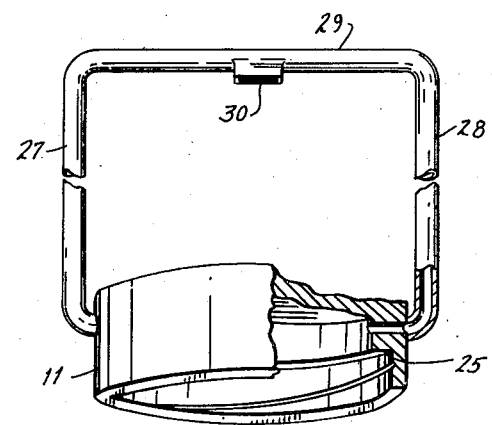
Fig. 5
INVENTOR.
SEBASTIANO MELITA
BY Joshua R H Potts
HIS ATTORNEY Dec. 4, 1951 S. MELITA 2,577,088
PRESSURE ACTUATED COFFEE MAKER
Filed March 28, 1947 4 Sheets-Sheet 3
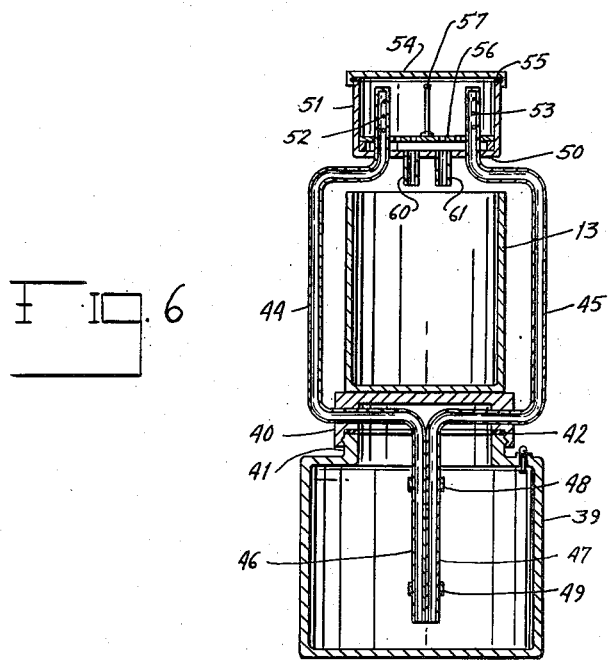
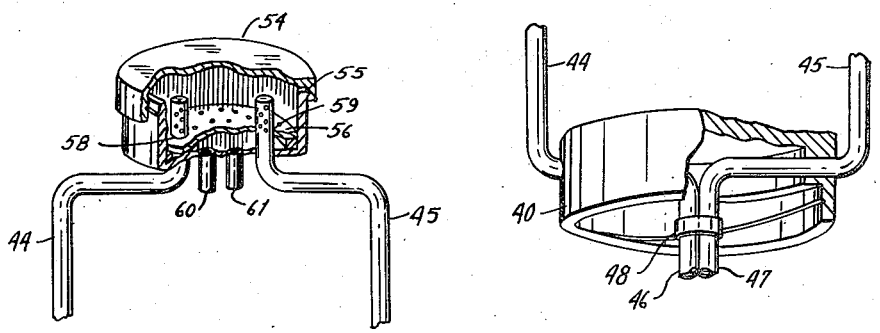
INVENTOR.
SEBASTIANO MELITA
BY Joshua R H Potts
HIS ATTORNEY Dec. 4, 1951          S. MELITA          2,577,088
PRESSURE ACTUATED COFFEE MAKER
Filed March 28, 1947          4 Sheets-Sheet 4
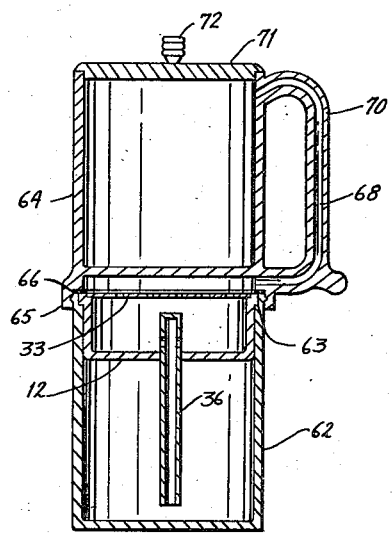
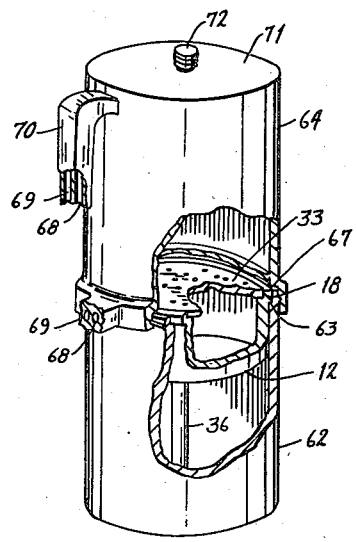
INVENTOR.
SEBASTIANO MELITA
BY
His Attorney

UNITED STATES PATENT OFFICE 2,577,088

PRESSURE ACTUATED COFFEE MAKER

Sebastiano Melita, Philadelphia, Pa.

Application March 28, 1947, Serial No. 737,788

2 Claims. (Cl. 99—303)

This invention relates to an improved coffee maker or pot of the sealed pressure actuating type, wherein expansion of the heated water forces the water upward through tubes to ground coffee, and in particular, a coffee maker wherein the water is forced upward through a plurality of tubes from which it passes through ground coffee and, from the coffee into a removable pot or container.

The purpose of this invention is to provide a coffee maker, particularly for domestic use, in which coffee may be made in the least possible time.

Numerous coffee making devices in the form of percolators or dripolators have been provided, wherein the heated water is forced upward through a tube or tubes to ground coffee, but in these, the coffee or final product passes back downward into the lower container, and in the usual percolators, the water may circulate through coffee grounds several times, wherein it is possible for the final product to contain bitters or other harmful properties of the coffee.

With this thought in mind, this invention contemplates a coffee maker, wherein it is impossible for the water to pass through the coffee grounds more than once, the water being forced upward in the usual manner, and then percolating through the grounds, and from the grounds directly into a coffee pot or other utensil from which it is poured into cups.

The coffee bean, as is well known to those familiar with the art of coffee making, is composed in the main of caffa, which is an oil and which is the sole element in the coffee bean structure which should be used in the preparation of coffee which is free from harmful, habit-forming drugs. The caffa oil, however, is entrapped in the coffee bean by a honeycomb structure, the chief constituents of which are tannic acid and caffeine, these two elements being the undesirables usually found in poorly made coffee. To properly extract the caffa oil from the coffee bean, it becomes necessary to grind such bean to a relative fineness in order to destroy the honeycomb structure retaining such oil. When hot water is passed through finely ground coffee, if such hot water is permitted to remain in contact with the ground coffee for too long a period of time, such hot water extracts from the ground coffee not only the desirable caffa oil, but also a considerable portion of the tannic acid and caffeine. Also, if the hot water is repeatedly passed through such ground coffee, as is necessary in the ordinary commonly termed percolator, where- in the water starts circulating before it reaches the boiling point, such coffee also contains a considerable amount of the harmful tannic acid and caffeine.

It is, therefore, essential in the construction of a coffee brewing device that boiling water only be passed through the ground coffee, that it be passed therethrough only once, and that it remain in contact with such ground coffee for only a comparatively short period of time.

In the usual type of coffee percolator, wherein the water is elevated by pressure, the coffee returns to a base element which, because of its construction, is provided with a handle that is secured thereto by clamping jaws, and because of the usual expansion and contraction, it is difficult to mount the handle on the base without a comparatively loose connection. With handles mounted on the usual base elements of coffee percolators, it is difficult to pour coffee therefrom into cups without spilling coffee, particularly in the saucers. To overcome this objection, this invention includes dropping the coffee from the point of contact of the water, with the ground coffee directly into a pot or container that may have a comparatively wide open end and spout, and that may be provided with a handle permanently secured thereto or integral therewith.

The object of this invention is, therefore, to provide an improved coffee pot or maker, wherein the water and coffee grounds are contained in one element and the coffee made therein is deposited into a separate element.

Another object of the invention is to provide a utensil for making coffee and the like, in which it is impossible for the coffee to pass through the grounds more than once.

Another object of the invention is to provide a coffee percolator of the pressure type, in which means is provided for the escape of air in the upper part of a base element thereof until pressure is formed therein.

Another object of the invention is to provide a coffee making utensil of the pressure actuated type, wherein the heated water passes upward to the coffee grounds through a plurality of tubes.

Another object of the invention is to provide an improved coffee maker, in which the parts may readily be removed for cleaning.

A further object of the invention is to provide an improved coffee making utensil, in which the coffee passes through the coffee grounds and from the grounds directly to a removable coffee pot or container, which is of a simple and economical construction.

With these and other objects in view, the invention embodies a base into which water is placed, a receptacle having a perforated element in combination therewith for holding coffee grounds, connecting elements through which water passes upward to the grounds, and a removable container adapted to be positioned to receive the coffee from the grounds.

For a full and more complete understanding of the invention, reference may be had to the following description and accompanying drawings, wherein:

Figure 1 is a view illustrating the complete coffee maker in the preferred design.

Figure 2 is a vertical section through the device, and also through the upwardly extending water carrying tubes, with the removable coffee pot omitted.

Figure 3 is a detail showing the coffee holding unit including the cup, in which the coffee grounds are positioned, with parts broken away, and shown in section.

Figure 4 is a detail showing the air escape valve also with parts broken away, and parts shown in section.

Figure 5 is a view showing the mounting element, in which upwardly extending tubes for carrying the coffee to the removable container are mounted.

Figure 6 is a vertical section illustrating a modification wherein the coffee grounds are positioned above the removable container.

Figure 7 is a detail showing the ground coffee receptacle at the upper end of the coffee maker illustrated in Figure 6.

Figure 8 is a view showing the mounting element by which the tubes, through which the heated water passes to the ground coffee, are mounted on the base.

Figure 9 is a view illustrating a further modification wherein the upwardly extending tubes through which the coffee is forced to the removable pot or container are incorporated in the handle of the pot.

Figure 10 is an elevational view of the coffee maker illustrated in Figure 9, with parts broken away and parts shown in section, showing the relative positions of the elements in the maker.

Referring now to the drawings, wherein like reference characters denote corresponding parts, the coffee maker of this invention includes as essential elements, a base 10 having a removable tube mounting cap 11, a ground coffee cup 12, and a removable pot or container 13.

The base 10 is generally cylindrical with the upper end open and the lower end 14 closed. The upper end, in the design illustrated in Figures 1 and 2, is formed with a neck 15 having threads 16 on the outer surface and a circumferential recess 17 in the upper inner edge, that is positioned to receive a bead 18 on the ground coffee cup 12, as shown in Figure 3. The base is also provided with an opening 19 having a boss 20 with kerfs therein around the upper end, and a valve 22 with a head 23 at the lower end; and a ball 24 at the upper end is positioned in the opening, as illustrated in Figure 4. The valve 21 is formed with a conical surface, and as pressure builds up in the base 10, the valve 21 is forced upward into the opening 18 until the gradually enlarging lower end closes the opening, thereby holding the pressure in the base.

The cap 11 is threaded on the thread 16 of the neck 15 with a shoulder 25 therein, seated upon the upper end of the neck, and with a ring or gasket 26 therein, a seal will be formed, closing the base 10. The cap 11 is provided with upwardly extending tubes 27 and 28, the upper ends of which are joined by a cross member 29, with a discharge opening 30 in the lower side thereof and positioned substantially above the center of the base. With a pot 13 having a handle 31 or a receiving container of any type placed upon the upper surface 32 of the cap 11, coffee forced upward through the tubes 27 and 28, will drop through the opening 30 into the pot.

The ground coffee holding cup 12 is, in the design shown in Figures 1 and 2, positioned in the upper end of the base 10, and the upper end is provided with a perforated disc 33 having a knob 34 thereon. The peripheral edge of the perforated disc is positioned in the recess 35 in the upper edge of the cup, as shown in Figure 3. A tube 36 extends downward from the lower end of the cup 12 to a point spaced from the lower end 14 of the base, and perforations 37 are provided in the tube above the lower surface 38 of the cup, wherein water forced by pressure in the base 10 upward through the tube percolates through the openings 37 into coffee grounds in the cup 12, and as the pressure increases, the water passing through the coffee is forced upward through the perforations in the disc 33, and through the tubes 27 and 28, to the pot 13, through the opening 30. With the parts arranged in this manner, the path of the hot water and coffee is continuous, and the coffee or water does not return to the base.

In the design illustrated in Figures 6, 7, and 8, the coffee maker is provided with a base 39 similar to the base 10, except that the recess 17 for the cup 12 is eliminated, and in this design, a cap 40 similar to the cap 11 is threaded on a neck 41 of the base with a sealing ring 42 between a shoulder 43 thereof and the upper end of the neck. The cap 40 is also provided with tubes 44 and 45 which extend through the side wall thereof, and downward into the base to a point spaced from the lower end thereof with the ends 46 and 47 extending into the base, secured together by bands 48 and 49. The tubes 44 and 45 extend upward through a base 50 of a receptacle 51, providing means supporting the receptacle from the base through the cap 40, and also providing means for carrying water from the base upward into the receptacle, with the water passing outward into the receptacle through perforations 52 and 53 in the ends of the tubes.

The receptacle 51 is provided with a cap 54 forming a closure, the cap being threaded on the upper end of the receptacle, and having a sealing ring or gasket 55 between the cap and upper edge of the receptacle. The receptacle is also provided with a perforated disc 56 having a handle 57 thereon, and the disc is provided with openings 58 and 59 by which it is freely positioned over the upwardly extending ends of the tubes 44 and 45. In cleaning the receptacle, the disc 56 may be removed to remove the coffee grounds.

The lower end 59 of the receptacle 51 is also provided with downwardly extending tubes or spouts 60 and 61, wherein coffee formed by water percolating through coffee grounds on the disc 56 of the receptacle 51 passes downward through the disc 56 into the coffee pot or container 13, which may be similar to the container illustrated in Figure 1.

With the parts arranged as illustrated in Figures 6, 7, and 8, pressure from the expanding water in the base 39 forces the water upward through the tubes 43 and 45, and through ground coffee to the removable coffee pot or container, as described.

In the design illustrated in Figures 9 and 10, the base 62, which is substantially the same as that shown in Figures 1 and 2, is provided with an inner circumferential recess 63, similar to the recess 17, and the cup 12 is positioned therein with the bead 18 in the recess 63. In this design, a pot 64, similar to the pot 13, is provided with a downwardly extending flange 65 through which it is threaded on the upper end of the base 62, and with a sealing ring 66 between a shoulder 67 thereof and the upper edge of the base, the two elements will be sealed together, wherein pressure in the base 62 will force water upward through the tube 36 of the cup 12, through ground coffee in the cup, and upward through the perforated disc 32, to an area 67 above the disc, and from this area, coffee will be forced upwardly through tubular recesses 68 and 69 in a handle 70, to the upper part of the pot 64. The pot may be open, or it may be provided with a cover or closure 71 having a handle 72, as shown. With a coffee maker of this design, the function is similar to the coffee maker illustrated in Figures 1 and 2 in that the hot water is forced upwardly into an inner cup in the base, and then upwardly through tubular elements from the upper ends of which the finished coffee is discharged, or drops into a removable pot or container.

In a coffee making utensil or pot of this type, water is placed in the base, and with ground coffee placed in the cup or receptacle, and the base sealed by the cap or removable container. The maker is placed over a heating element or fire, and as the water is expanded by the heat, air in the upper portion of the base will first pass out through the air escape valve, and after the pressure closes the valve, the water is forced upwardly through the ground coffee, and then it continues to pass upward, with the desired properties of the coffee suspended therein, and is dispensed into a receptacle, such as a coffee pot, pitcher, or the like. In this coffee maker, the water and coffee travel continuously in the same direction, and there is no possibility of recirculation, which often results in bitter and other objectionable properties of the coffee bean being present in the finished product.

While certain preferred embodiments of the invention are hereinbefore set forth, it is to be clearly understood that the invention is not to be limited to the exact construction illustrated and described because various modifications of the details may be provided in putting the invention into practice within the purview of the appended claims.

What is claimed is:

1. In coffee making apparatus, the combination of: a base in the form of a receptacle adapted to contain water and having a top wall formed with a valve opening communicating with atmosphere, a valve in said opening adapted to be closed under the influence of the pressure of steam in said base, a ground coffee receptacle mounted in the upper part of said base, a closure member sealing said coffee receptacle and the upper part of said base, a tubular element extending from a point in the lower part of the base through and into said ground coffee receptacle, a container for brewed coffee positioned above said base, and a tubular loop extending upwardly from the upper portion of said base at opposite sides thereof when it communicates with said ground coffee receptacle and around said container for brewed coffee, said tubular loop having a downwardly opening orifice positioned above said brewed coffee container.

2. In coffee making apparatus, the combination of: a base in the form of a receptacle adapted to contain water and having a top wall formed with a valve opening communicating with atmosphere, a valve in said opening adapted to be closed under the influence of the pressure of steam in said base, a ground coffee receptacle mounted in the upper part of said base, a closure member sealing said coffee receptacle and the upper part of said base, a tubular element extending from a point in the lower part of the base through and into said ground coffee receptacle, said tube having radial openings within said ground coffee receptacle closely adjacent to the bottom thereof, a container for brewed coffee positioned above said base, and a tubular loop extending upwardly from the upper portion of said base at opposite sides thereof where it communicates with said ground coffee receptacle and around said container for brewed coffee, said tubular loop having a downwardly opening orifice positioned above said brewed coffee container.

SEBASTIANO MELITA.

REFERENCES CITED

The following references are of record in the file of this patent:

UNITED STATES PATENTS

| Number | Name | Date |
|---|---|---|
| 192,943 | Sherwood | Jan. 10, 1877 |
| 449,602 | Thrall | Mar. 31, 1891 |
| 666,593 | Babin | Jan. 22, 1901 |
| 1,035,099 | Paone | Aug. 6, 1912 |
| 1,171,022 | Ciletti | Feb. 8, 1916 |
| 1,863,710 | Berg et al. | June 21, 1932 |
| 2,268,633 | Aske | Jan. 6, 1942 |
| 2,513,594 | Snyder | July 4, 1950 |

FOREIGN PATENTS

| Number | Country | Date |
|---|---|---|
| 258,201 | Italy | Apr. 9, 1928 |
| 520,559 | Germany | Mar. 12, 1931 |
| 701,434 | France | Jan. 7, 1931 |